United States Patent Office 3,162,491
Patented Dec. 22, 1964

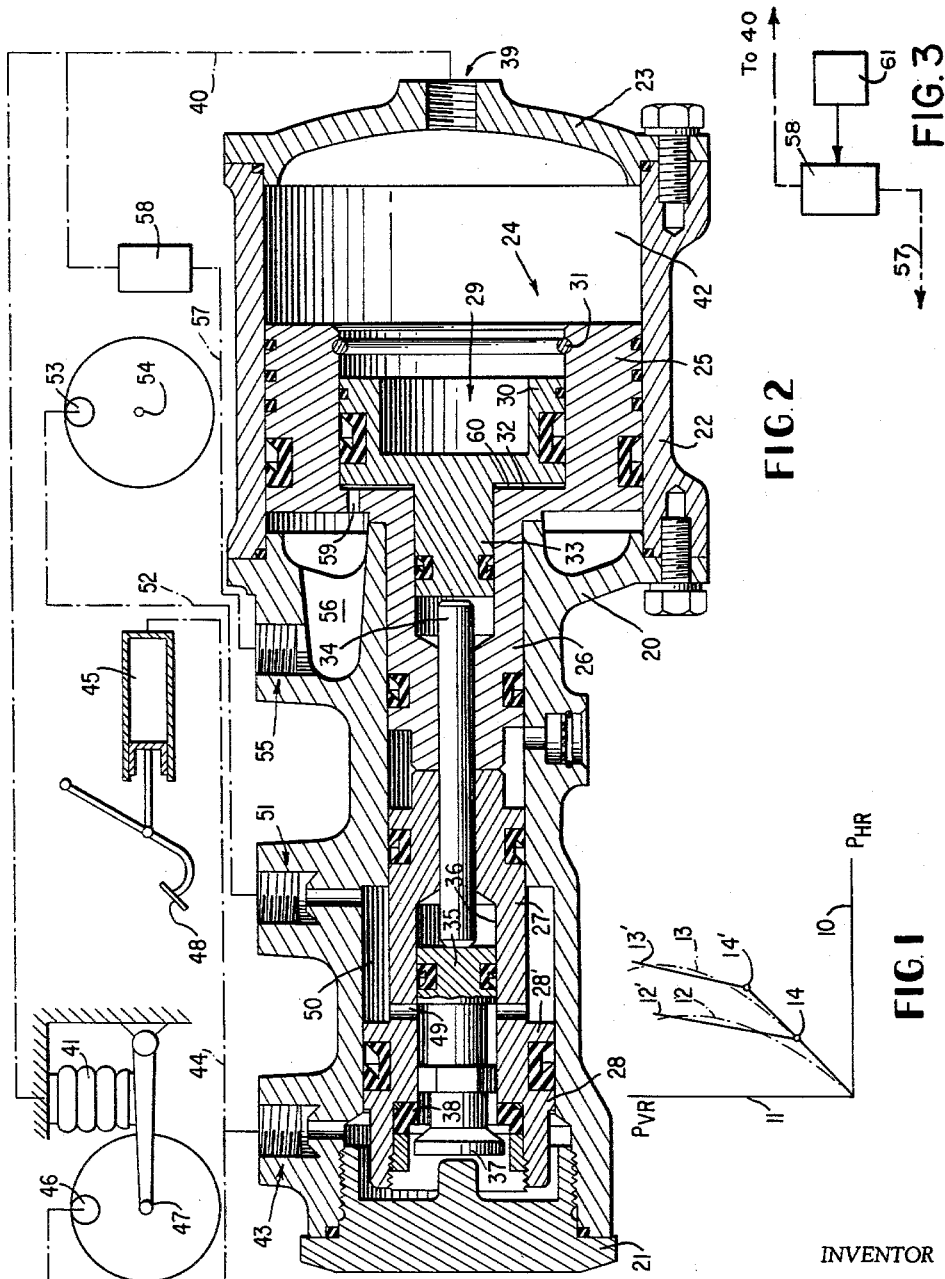

3,162,491
BRAKE FORCE REGULATING DEVICE FOR VEHICLES ESPECIALLY THOSE WITH PNEUMATIC SPRINGS
Friedrich H. van Winsen, Kirchheim-Teck, Germany, assignor to Daimler-Benz Aktiengesellschaft, Stuttgart-Unterturkheim, Germany
Filed Mar. 3, 1961, Ser. No. 93,160
Claims priority, application Germany Mar. 3, 1960
10 Claims. (Cl. 303—6)

The present invention relates to a brake force regulating device for motor vehicles, especially for those provided with pneumatic springs, whereby, for purposes of distribution of the brake force to the front and rear axle, a brake force control or regulating device is inserted between the master brake cylinder actuated by the brake pedal and the wheel brake cylinders of an axle which regulating device is adapted to adjust the brake force for the other axle.

The brake force control or regulating device according to the present invention is provided with a load piston and with a control piston which both are loaded, on the one hand, by the brake pressure at the master brake cylinder and, on the other, by a force dependent on the spring system, especially by the pressure in the bellows of the pneumatic spring system, and in which the load piston simultaneously forms a pressure space from which is branched off the brake pressure for the other axle, i.e., for the brake cylinders of the other axle.

The adaptation of the actual distribution of brake forces to the ideal curve of the brake force distribution takes place by shifting the brake force regulator device to another distribution at a predetermined shifting point. The interdependence on the spring system thereby takes into consideration the overall weight of the vehicle. The shifting point is, therefore, located differently with a fully loaded vehicle than with an empty vehicle. The proposed arrangement described hereinabove, however, has the disadvantage that the pressures available within the pneumatic spring system are not sufficient to achieve a displacement of the shifting point to the actually desired value, i.e., the proposed arrangement can select the shifting point only approximately accurately for one load condition of the vehicle.

The present invention is concerned with the elimination of the aforementioned disadvantage, and solves the underlying problems with a brake force regulating device of the type described hereinabove by loading the piston parts of the loading piston and of the control piston, which are normally loaded by the bellows pressure of the pneumatic spring system, on the rear side thereof with a force, in particular with an essentially constant force.

The present invention additionally proposes to construct the piston parts of the load piston and control piston as double acting pistons and to load the same on the back side thereof with a counterpressure in particular with a constant counterpressure. This counterpressure is branched off according to the present invention from the pneumatic spring system and is automatically maintained by means of a control valve at a value that is, in particular, constant but may also possibly be adjustable.

The shifting point of the brake force regulator device may be matched with the present invention in each case to the highest as well as to the lowest overall weight of the vehicle. Consequently, a very good adaptation of the actually attained brake force distribution in each load condition of the vehicle to the ideal brake force distribution is achieved.

Accordingly, it is an object of the present invention to provide a brake force regulating device of the type described hereinabove which effectively eliminates the inadequacies and shortcomings mentioned above.

It is another object of the present invention to provide a brake force regulating device which permits a very favorable adaptation of the actually obtainable operating characteristics to the theoretically ideal curves desired with such device.

Still another object of the present invention resides in the provision of a brake force control means which enables an adaptation of the shifting point to the highest as well as to the lowest overall weight conditions of the vehicle.

Still another object of the present invention resides in the provision of a brake force regulating device which adjusts automatically the brake force supplied to the front and rear wheels in a manner that approaches the ideal curves for the distribution thereof.

These and other objects, features and advantages of the present invention will become more obvious from the following description when taken in connection with the accompanying drawing which shows, for purposes of illustration only, one embodiment in accordance with the present invention, and wherein:

FIGURE 1 is a diagram illustrating the brake force distribution.

FIGURE 2 is a longitudinal axial cross-sectional view through a brake force regulating device in accordance with the present invention together with a schematic showing of the interconnection thereof with the vehicle brake system, and FIGURE 3 is a schematic diagram illustrating a modification of the invention.

Referring now to the drawing, and more particularly to FIGURE 1, this figure illustrates diagrammatically the brake force distribution by reference to the brake force or braking pressure 10 at the rear axle and the brake force or braking pressure 11 at the front axle. The ideal brake force distribution is indicated by the dot and dash line 12 for the case of an empty vehicle and by the dot and dash line 13 for the case of a fully loaded vehicle. These two ideal curves 12 and 13 are approximated by the full line curves 12′ and 13′ that are actually attained with the brake force regulating device in accordance with the present invention. Both approximation curves 12′ and 13′ proceed at first under an angle of 45 degrees up to the shifting points 14 and 14′, respectively. These two shifting points 14 and 14′ have to be spaced apart a sufficient amount by the brake force regulating device in order that the curve 13′ may actually approach the ideal curve 13.

According to FIGURE 2, the brake force regulating device according to the present invention is composed of a two-partite or multi-partite housing 20 which is closed off by means of a cover 21 at the left end thereof as viewed in FIGURE 2. A further housing 22 with its respective cover 23 is attached to the housing 20 whereby the housing 22 has a larger diameter than the housing 20. A load piston generally designated by reference numeral 24 is arranged within both housings 20 and 22. The load piston 24 is constituted by a piston part 25 which corresponds in diameter to the larger housing 22 and by a piston-like extension 26 of a diameter corresponding to that of the narrower housing 20. A further piston part 27 of a diameter corresponding to that of the narrower housing 20 also forms part of the load piston assembly 24. The piston part 27 passes over into an annular extension or ring-like portion 28 of slightly larger diameter.

A control piston generally designated by reference numeral 29 is arranged concentrically within the load piston 24. The control piston assembly 29 essentially consists of a piston part 30 which is arranged within the piston part 25 and is axially movable relative thereto. A snap ring 31 or the like serves, on the one hand, as abutment for the axial movement of the piston part 30 while the bottom 32 of the piston part 25 forms the opposite abutment for the axial movements of the piston part 30.

The piston part 30 of the control piston 29 is provided with a cylindrical extension 33 which is operatively connected through a central transmission rod 34 with a valve piston 35. The valve piston 35 is arranged within a central bore 36 of the piston part 27 of the load piston 24. The valve piston 35 is provided at the left end thereof with a valve disk 37 for which a valve seat 38 is provided within the piston part 27 of the load piston 24. A connection 39 is provided centrally at the cover 23 whereby the connection 39 is in communication through a line 40 with the pneumatic spring system of the vehicle in such a manner that the pressure within bellows 41 of the spring system, and more particularly, appropriately at the rear axle, is effective within the space 42 of the housing 22. This pressure displaces both the load piston 24 as well as the control piston 29 completely toward the left into the left end position thereof illustrated in FIGURE 2.

A connection 43 is provided within the housing part 20 which is in communication through lines 44 with the master brake cylinder 45 of the vehicle as well as also with the brake cylinder or cylinders 46 at the rear axle 47. The pressure within the master brake cylinder 45 is thereby able to become effective by connection 43 on the left end face of the piston part 27, 28, and especially of the valve disk 37 of the valve piston 35.

In the illustrated position of the brake regulating device according to the present invention shown in FIGURE 2, the valve piston 35 is in the fully open position thereof. If now a braking pressure is built up by the brake pedal 48 within the master brake cylinder 45, then this braking pressure is continued past the open valve-piston 35 through the bore 49 into an annular space 50 which is disposed to the rear portion 28' of the annular extension 28 of the load piston part 27. The annular space 50 is connected through the connection 51 and line 52 with the brake cylinder or cylinders 53 of the front axle 54. Consequently, as long as the braking pressure in the master brake cylinder 45 does not exceed a predetermined amount, the same braking pressure prevails at the brake cylinders 46 and 53 of both axles which corresponds to the portion of the curves 12' and 13' subtending an essentially 45 degree angle in FIGURE 1.

However, if the pressure in the master brake cylinder 45 exceeds a predetermined value, than the valve piston 35 inclusive the entire control piston 29 is moved toward the right as viewed in FIGURE 2 until the valve disk 37 rests against its valve seat 38. The valve 37, 38 is now closed and the shifting point, for example, point 14 of FIGURE 1 is now reached. The braking pressure at the front axle 54 is now greater by a predetermined amount than that at the rear axle 47. The ratio of both pressures can be influenced by an appropriate selection of the annular surface 28' of the annular extension 28 as well as of the left end faces of the load and control pistons 24 and 29.

By reason of the interdependence of the pressure within space 42 on the pressure within the spring bellows 41 of the pneumatic spring system, the shifting point is different for each vehicle load, dependent on the prevailing load condition of the vehicle. The present invention now provides a further connection generally designated by reference numeral 55 within housing 20 which leads to a space 56 disposed on the rear side of the load piston part 25. The connection 55 is in communication, through line 57 and a regulating valve 58 of any conventional construction and illustrated only schematically, with the pneumatic spring system in any appropriate manner. The control valve 58 maintains an essentially constant counterpressure within space 56. It is possible by means of this counterpressure on the load piston part 25 to match or adapt the location of the shifting point also to the maximum load conditions of the vehicle which is not possible alone by reliance on the bellows pressure.

At least one bore 59 which connects the space 56 with a space 60 on the rear side of the control piston part 30 is provided within the bottom 32 of the piston part 25. Consequently, the control piston 29 is also loaded by a constant counterpressure which has the aforementioned influence on the position of the shifting point 14'.

It is also possible as shown in FIGURE 3 to control the counterpressure prevailing within spaces 56 and 60 by regulating the control device 58 in dependence on the vehicle load by means of a load sensitive adjusting mechanism 61 of any conventional construction so as to produce with a higher load a lower pressure. The brake force regulating member may thereby be kept relatively smaller in dimensions.

While I have shown and described one embodiment in accordance with the present invention, it is understood that the same is not limited thereto but is susceptible of many changes and modifications within the spirit and scope thereof, and I, therefore, do not wish to be limited to the details shown and described herein but intend to cover all such changes and modifications as are encompassed by the scope of the appended claims.

I claim:

1. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure.

2. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a constant counterpressure.

3. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure, parts of said piston means and control piston means being constructed as double-acting pistons acted upon on the other sides thereof by said counterpressure.

4. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a constant counterpressure, parts of said piston means and control piston means being constructed as double-acting pistons acted upon on the other sides thereof by said constant counterpressure, and means for deriving said counterpressure from the pressure of said pneumatic spring means including regulating valve means for maintaining an essentially constant pressure value.

5. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure, parts of said piston means and control piston means being constructed as double-acting pistons acted upon on the other sides thereof by said counterpressure, and means for deriving said counterpressure from the pressure of said pneumatic spring means including regulating valve means for maintaining an essentially constant pressure value, said value being adjustable.

6. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure, parts of said piston means and control piston means being constructed as double-acting pistons acted upon on the other sides thereof by said counterpressure, and means for deriving said counterpressure from the pressure of said pneumatic spring means including regulating valve means for maintaining an essentially constant pressure value, said control piston means being arranged concentrically within said piston means, and at least one bore provided within the piston part of said piston means to enable the counterpressure acting upon the other side of said piston means to reach the other side of said control piston means.

7. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure, and means for automatically regulating said counter force in dependence on the vehicle load.

8. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a counterpressure, and means for automatically regulating said counter force in dependence on the vehicle load in such a manner as to provide a decrease in said counter force with an increase in vehicle load and vice versa.

9. In a brake force control system for the hydraulic brakes of motor vehicles provided with pneumatic spring means, which system for purposes of distribution of the brake force to the front and rear axles is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a constant counterpressure, parts of said piston means and control piston means being constructed as double-acting pistons acted upon on the other sides thereof by said constant counterpressure, and means for deriving said counterpressure from the pressure of said pneumatic spring means including regulating valve means for maintaining an essentially constant pressure value, and means for automatically regulating said counter force in dependence on the vehicle load.

10. In a brake force control system for the hydraulic brakes of motor vehicles provided with pneumatic spring means, which system for purposes of distribution of the brake force to the front and rear axle is operatively associated with the line system connected between the master brake cylinder and the brake cylinders of one of said axles, and which comprises a pressure control piston assembly including piston means acted upon on one side thereof by the brake pressure of the brake cylinders of the other axle and on the other side thereof by the brake pressure of the brake cylinders of said one axle, and said piston means being provided with a controllable passage interconnecting the one and other sides of said piston means, and a control member for controlling said passage adapted to be acted upon in opposite directions by the pressure prevailing within said master brake cylinder and by the pressure within said pneumatic spring means in such a manner that said control member, with a given pressure within said pneumatic spring means, closes said passage only with a higher pressure within said master brake cylinder, the improvement essentially consisting of control piston means forming part of said piston assembly and operatively connected with said control member for actuating said control member, said control piston means being acted upon on one side thereof and in a direction opposite the brake pressure prevailing on the other side of said piston means by a pressure depending on the pressure within said pneumatic spring means and on the other side thereof by a constant counterpressure, parts of said piston means and control piston means being constructed as double-acting pistons acted upon on the other sides thereof by said constant counterpressure, and means for deriving said counterpressure from the pressure of said pneumatic spring means including regulating valve means for maintaining an essentially constant pressure value, said value being adjustable, said control piston means being arranged concentrically within said piston means, and at least one bore provided within the piston part of said piston means to enable the counterpressure acting upon the other side of said piston means to reach the other side of said control piston means, and means for automatically regulating said counter force in dependence on the vehicle load in such a manner as to provide a decrease in said counter force with an increase in vehicle load and vice versa.

No references cited.